United States Patent Office 3,309,269
Patented Mar. 14, 1967

3,309,269
PROCESS COMPRISING EMPLOYING TRIALKYL-TIN CARBOXYLATES FOR REPELLING RODENTS
Paul F. Thompson, Deer Park, Ohio, assignor to Carlisle Chemical Works, Inc., Reading, Ohio, a corporation of Ohio
No Drawing. Filed July 11, 1963, Ser. No. 294,248
9 Claims. (Cl. 167—46)

The present invention relates to rodent repellents.

Rodents, such as mice, rats, rabbits and squirrels, are responsible for large financial losses in this country every year. Thus, rodents attack growing trees and other nersery stock, as well as various food plants. The rodent problem is particularly acute in buildings and warehouses which are used for storage of various products, such as seeds and grain. They also cause damage to other stored foodstuffs.

Accordingly, it is an object of the present invention to provide an improved method for repelling rodents.

Another object is to protect growing plants and other materials normally consumed as food by rodents.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by applying to the environment from which the rodents are to be repelled a trialkyl tin carboxylate. Suitable compounds have the formula

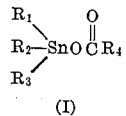

(I)

where $R_1$, $R_2$ and $R_3$ are alkyl radicals having 1 to 8 carbon atoms and $R_4$ is hydrogen, alkenyl, alkyl, aryl, aralkyl, haloalkyl, hydroxyalkyl or haloaryl. Illustrative compounds which can be employed include tributyltin formate, tributyltin acetate, tributyltin propionate, tributyltin 2-ethylhexoate, tributyltin butyrate, tributyltin stearate, tributyltin benzoate, tributyltin naphthoate, tributyltin 4-methylbenzoate, tributyltin phenylacetate, tributyltin chloroacetate, tributyltin 2-chloropropionate, tributyltin bromoacetate, tributyltin iodoacetate, tributyltin fluoroacetate, tributyltin dichloroacetate, tributyltin acrylate, tributyltin methacrylate, tributyltin decanoate, tributyltin neodecanoate, tributyltin 2-chlorobenzoate, tributyltin glycolate, tributyltin 3-hydroxypropionate, trimethyltin butyrate, triethyltin acetate, tripropyltin acetate, propyl dibutyltin acetate, triamyltin acetate, trihexyltin acetate, trioctyltin acetate, triethyltin octoate, trimethyltin benzoate, tributyltin laurate, tripropyltin glycolate and tributyltin oleate.

There also can be used compounds having the formula

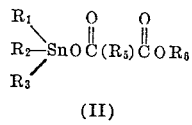

(II)

where $R_5$ is selected from the group consisting of $(CH_2)_n$ where $n$ is 0 or a positive interger, $-CH=CH-$, and phenylene, $R_6$ is an alkyl group

and $R_1$, $R_2$ and $R_3$ are as previously defined.

Preferably, $R_1$, $R_2$ and $R_3$ do not have over 6 carbon atoms each.

Examples of suitable compounds within Formula II are bis (tributyltin) phthalate, bis (tributyltin) maleate, bis (tributyltin) fumarate, bis (tributyltin) oxalate, bis (tributyltin) malonate, bis (tributyltin) succinate, bis (tributyltin) glutarate, bis (tributyltin) adipate, bis (tributyltin) sebacate, tributyltin monopropyl fumarate, tributyltin monobutyl maleate, tributyltin monomethyl maleate, tributyltin monodecyl maleate, tributyltin monobutyl adipate, tributyltin monoethyl succinate, tributyltin monobutyl phthalate, tributyltin monoamyl oxalate, trimethyltin monohexyl maleate, triethyltin monoisopropyl adipate, trihexyltin monooctyl glutarate, bis (trimethyltin) phthalate, bis (trimethyltin) maleate, bis (triisopropyltin) adipate, bis (trihexyltin) succinate, ethyldibutyltin monoethyl maleate, bis (tributyltin) monooctadecyl adipate, bis (tributyltin) terephthalate, tributyltin monomethyl isophthalate.

Many of the above compounds are old. The others can be made in conventional fashion, e.g., by reacting a trialkyltin chloride with an alkali metal salt of the appropriate mono or di carboxylic acid, as shown in Eberly Patent 2,560,034, for example, or by reacting a trialkyltin hydroxide with the appropriate mono or di carboxylic acid or half ester of dicarboxylic acid.

The compounds of the present invention were tested for rodent repellency using standard tests.

One test is to mix wheat seeds with the compound to be tested and determine the amount of compound required to repel 50% of the rats, i.e., 50% of the rats tested would not touch the seed.

Another test is to place one tablespoon of a mixture of rolled oats and ground fox chow in a 10 ounce burlap bag 4 inches square and then staple the open end of the bag shut. The bags were offered to the animals for an overnight period of 16 to 18 hours. A bag was considered to be penterated when the test animal made a hole sufficiently large to obtain the food. Generally, 10 animals were used in each test. The burlap bags were impregnated with various proportions of the test chemicals in order to determine the concentration which would repel 50% of the test animals, i.e., the test animals did not penetrate the bags. The animals used in the test were the house mice (Mus musculus) and the Norway rat.

The results of the test are reported in the following table:

| Compound | Test Aminal | Seed $R_{50}$, percent | Burlap $R_{50}$, mg./in.² |
|---|---|---|---|
| Tributyltin acetate | House mice | 0.11 | 2 |
| Do | Norway rat | | |
| Tributyltin Benzoate | House mice | | 1 |
| Tributyltin formate | do | | |
| Tributyltin glycolate | do | | |
| Tributyltin chloroacetate | do | | |
| Tributyltin 2-ethyl-hexoate | do | | |
| Tributyltin neodecanoate | do | | |

In the table $R_{50}$ indicates that 50% of the test animals were repelled and mg./in.$^2$ signifies milligrams per square inch.

In the burlap bag test with the Norway rat 1/7 as much tributyltin acetate was required to repel the rats as was required with tributyltin chloride. When house mice were the test animals there was needed only approximately 1/2 as much tributyltin acetate as tributyltin chloride.

The compounds of the present invention are applied to the environment from which the rodents are to be repelled. Thus, they are applied to bags or boxes containing seeds, e.g., wheat, oat, corn or barley, or other foodstuffs, e.g., sugar, potatoes, fruits, lettuce, carrots, etc. They also can be applied to the floors of warehouses and other buildings.

It is not necessary to apply the tin compounds to the foodstuff or seed itself since application to the container or the floors of the building containing the foods or seed is adequate to insure rodent repellency.

The compounds can be dusted on the warehouse floor or container or they can be applied from a dispersion in a volatile solvent, e.g., a hydrocarbon such as pentane, hexane, or a ketone such as acetone or methyl ethyl ketone.

What is claimed is:

1. A process of repelling rodents comprising applying to the environment from which the rodents are to be repelled an effective amount of a rodent repellent selected from the group consisting of

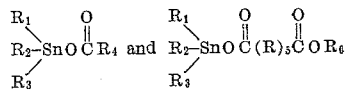

where $R_1$, $R_2$ and $R_3$ are alkyls having 1 to 8 carbons, $R_4$ is selected from the group consisting of hydrogen, alkyl, hydroxyalkyl, alkenyl, phenyl, methylphenyl, naphthyl, chlorophenyl, phenyl methyl and haloalkyl, $R_5$ is selected from the group consisting of $-(CH_2)_n-$, $-CH=CH-$, and phenylene, $R_6$ is selected from the group consisting of an alkyl group and $R_1$

and $n$ is 0 or a positive integer up to 10.

2. A process of repelling rodents comprising applying to the environment from which the rodents are to be repelled an effective amount of a rodent repellent having the formula

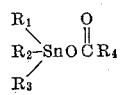

where $R_1$, $R_2$ and $R_3$ are alkyls having 1 to 8 carbons and $R_4$ is selected from the group consisting of alkyl, alkenyl, phenyl, methylphenyl, naphthyl, phenyl methyl, haloalkyl, hydroxyalkyl and chlorophenyl.

3. A process of repelling rodents from a package containing food comprising applying to the package an effective amount of a rodent repellent having the formula

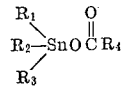

where $R_1$, $R_2$ and $R_3$ are alkyls having 1 to 8 carbons and $R_4$ is selected from the group consisting of hydrogen, alkyl, alkenyl, phenyl, methylphenyl, naphthyl, phenyl methyl, haloalkyl, chlorophenyl and hydroxyalkyl.

4. A process of repelling rodents from a package containing a member of the group consisting of seeds and grains comprising applying to the package an effective amount of a rodent repellent having the formula

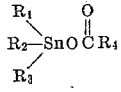

where $R_1$, $R_2$ and $R_3$ are alkyls having 1 to 8 carbons and R is selected from the group consisting of hydrogen, alkyl, alkenyl, phenyl, methylphenyl, naphthyl, phenyl methyl, haloalkyl, chlorophenyl and hydroxyalkyl.

5. A process of repelling rodents comprising applying to the environment from which the rodents are to be repelled an effective amount of a trialkyltin alkanoate wherein the alkyl groups have 1 to 6 carbons.

6. A process of repelling rodents comprising applying to the environment from which the rodents are to be repelled an effective amount of tributyltin acetate.

7. A process of repelling rodents comprising applying to the environment from which the rodents are to be repelled an effective amount of a trialkyltin benzoate wherein the alkyl groups have 1 to 6 carbons.

8. A process of repelling rodents comprising applying to the environment from which the rodents are to be repelled an effective amount of a trialkyltin chloroacetate wherein the alkyl groups have 1 to 6 carbons.

9. A process of repelling rodents comprising applying to the environment from which the rodents are to be repelled an effective amount of a trialkyltin glycolate wherein the alkyl groups have 1 to 6 carbons.

References Cited by the Examiner
UNITED STATES PATENTS

| | | | | |
|---|---|---|---|---|
| 2,560,034 | 7/1951 | Eberly | | 260—429.7 |
| 2,977,379 | 3/1961 | Dorfelt et al. | | 260—429.7 |
| 3,132,992 | 5/1964 | Kimmel | | 167—46 |

ALBERT T. MEYERS, *Primary Examiner.*

GEORGE A. MENTIS, *Assistant Examiner.*